(12) United States Patent
Sandvig et al.

(10) Patent No.: US 10,323,426 B1
(45) Date of Patent: Jun. 18, 2019

(54) WALL REPAIR PLUG SYSTEM

(71) Applicants: Kent Bryan Sandvig, Grimes, IA (US); Shaun T. Kjellman, Kirkland, WA (US); Jason D. Berube, Hampstead, NH (US)

(72) Inventors: Kent Bryan Sandvig, Grimes, IA (US); Shaun T. Kjellman, Kirkland, WA (US); Jason D. Berube, Hampstead, NH (US)

(73) Assignee: Kent Sandvig, Grimes, IA (US)

( * ) Notice: Subject to any disclaimer, the term of this patent is extended or adjusted under 35 U.S.C. 154(b) by 0 days.

(21) Appl. No.: 15/946,024

(22) Filed: Apr. 5, 2018

Related U.S. Application Data (60) Provisional application No. 62/482,542, filed on Apr. 6, 2017.

(51) Int. Cl.
| | |
|---|---|
| *E04G 23/02* | (2006.01) |
| *F16B 13/00* | (2006.01) |
| *F16B 13/04* | (2006.01) |
| *B23B 51/04* | (2006.01) |
| *A47K 10/10* | (2006.01) |

(52) U.S. Cl.
CPC .......... *E04G 23/02* (2013.01); *B23B 51/0426* (2013.01); *F16B 13/003* (2013.01); *F16B 13/04* (2013.01); *A47K 10/10* (2013.01); *B23B 2251/428* (2013.01)

(58) Field of Classification Search
CPC ........ E04G 23/02; F16B 13/04; F16B 13/003; B23B 51/0426
USPC ................................ 52/309.9, 514
See application file for complete search history.

(56) References Cited

U.S. PATENT DOCUMENTS

| | | | | |
|---|---|---|---|---|
| 3,217,816 A | * | 11/1965 | Boyer | B23B 51/0426 166/55.6 |
| 3,335,632 A | | 8/1967 | Fischer | |
| 3,467,209 A | | 9/1969 | Chromy | |
| 3,575,372 A | * | 4/1971 | Emberson | A63B 71/028 248/499 |
| 4,406,107 A | * | 9/1983 | Schoonbeck | E04G 23/0207 52/514 |
| 4,432,677 A | * | 2/1984 | Lewis | B23B 51/0426 408/203.5 |
| 4,715,151 A | * | 12/1987 | Garblik | E04G 23/02 52/2.18 |

(Continued)

FOREIGN PATENT DOCUMENTS

DE        10305696 A1 * 8/2004 ............. B23B 45/06

*Primary Examiner* — Patrick J Maestri
*Assistant Examiner* — Joseph J. Sadlon
(74) *Attorney, Agent, or Firm* — QuickPatents, LLC; Kevin Prince (57) ABSTRACT

A plug system for repairing a hole in a wall includes a cylindrical plug body that has a grooving implement adapted to cut or abrade the wall at one end and a thread projecting outwardly from the plug body at an opposing end. A plug is adapted for fitting within a rear cavity and has at least one screw aperture. In use, with the plug body fixed with the rotary tool, the rotary tool is activated to rotate the plug body to cut or abrade the wall around the hole. The thread of the plug body engages the wall until the proximal end of the plug body is substantially flush with the wall to repair the wall, and to provide screw apertures at the desired location on the wall to hold an object with screws if needed.

18 Claims, 6 Drawing Sheets

(56) References Cited

U.S. PATENT DOCUMENTS

| | | | |
|---|---|---|---|
| 4,818,165 A | 4/1989 | Shirai | |
| 4,856,951 A | 8/1989 | Blucher | |
| 4,968,189 A * | 11/1990 | Pidgeon | B23B 51/0426 408/1 R |
| 5,167,475 A * | 12/1992 | Miyanaga | B23B 31/113 408/201 |
| 5,209,621 A | 5/1993 | Burbidge | |
| 5,224,805 A * | 7/1993 | Moretti | F16B 13/001 411/30 |
| 5,413,437 A * | 5/1995 | Bristow | B23B 51/0426 408/1 R |
| 5,449,257 A | 9/1995 | Giannuzzi | |
| 5,733,074 A * | 3/1998 | Stock | B23B 37/00 408/129 |
| 5,749,687 A * | 5/1998 | Kilgore, III | F16B 13/0808 411/29 |
| 6,588,169 B2 * | 7/2003 | Sarver | E04B 1/41 24/16 R |
| 6,851,492 B2 * | 2/2005 | Sato | B23B 51/0027 175/273 |
| 6,887,018 B2 * | 5/2005 | Ostermeier | B23B 31/107 279/141 |
| 6,893,194 B2 * | 5/2005 | Jones | B23B 51/0426 408/1 R |
| 7,121,054 B2 * | 10/2006 | Shock | E04G 23/0207 52/514.5 |
| 7,494,310 B1 | 2/2009 | Bodin | |
| 7,819,613 B2 | 10/2010 | Strom | |
| 7,824,137 B2 * | 11/2010 | Vasudeva | B23B 31/008 206/379 |
| 7,836,659 B1 * | 11/2010 | Barnes | E04G 23/0203 52/220.6 |
| 7,938,607 B2 * | 5/2011 | Wang | F16B 5/0208 411/107 |
| 8,381,474 B2 * | 2/2013 | Lewis | E04G 23/0207 52/514 |
| 8,720,156 B2 * | 5/2014 | Porter | E04F 13/0853 411/349 |
| 8,721,236 B2 * | 5/2014 | Kazda | B23B 51/0473 408/204 |
| 8,827,604 B1 * | 9/2014 | Corey | B23N 1/0426 408/204 |
| 9,097,067 B2 * | 8/2015 | Gosamo | B23B 51/0466 |
| 9,108,255 B2 * | 8/2015 | Li | B23C 5/26 |
| 9,248,537 B2 * | 2/2016 | O'Neill | B23Q 3/103 |
| 9,441,385 B1 | 9/2016 | Tsyukalo | |
| 9,486,860 B2 * | 11/2016 | Kazda | B23B 51/0473 |
| 9,579,733 B2 * | 2/2017 | Yu | B23B 51/0473 |
| 9,586,270 B2 * | 3/2017 | Zielonka | B23B 51/0406 |
| 9,637,940 B2 * | 5/2017 | Naylor | E04G 23/0203 |
| 9,714,674 B1 | 7/2017 | Rosebrugh | |
| 9,884,373 B2 * | 2/2018 | Keightley | B23B 51/0406 |
| 9,945,410 B2 * | 4/2018 | Perrier | F16B 13/061 |
| 10,052,695 B2 * | 8/2018 | Klabunde | B23B 31/008 |
| 2003/0190211 A1 | 10/2003 | Bodin | |
| 2003/0206784 A1 | 11/2003 | Huang | |
| 2004/0096291 A1 | 5/2004 | Reiter | |
| 2005/0058521 A1 | 3/2005 | Stevenson | |
| 2005/0079027 A1 | 4/2005 | Ernst | |
| 2005/0163585 A1 | 7/2005 | Bodin | |
| 2006/0090611 A1 * | 5/2006 | Hanley | B23B 49/005 81/121.1 |
| 2006/0210366 A1 | 9/2006 | Kozak | |
| 2007/0006548 A1 | 1/2007 | Trudeau | |
| 2007/0053763 A1 | 3/2007 | Allaart | |
| 2008/0063488 A1 | 3/2008 | Cheng | |
| 2009/0108155 A1 | 4/2009 | Benitez | |
| 2009/0311069 A1 | 12/2009 | Nagayama | |
| 2011/0027045 A1 | 2/2011 | Hazut | |
| 2011/0131787 A1 | 6/2011 | Moroney | |
| 2015/0184406 A1 | 7/2015 | Naylor | |
| 2016/0273235 A1 * | 9/2016 | Davidian | E04G 23/0207 |
| 2017/0054281 A1 | 2/2017 | Lopez Rubio | |
| 2017/0096816 A1 | 4/2017 | Keshet | |
| 2017/0122359 A1 | 5/2017 | Foerster | |
| 2017/0191278 A1 | 7/2017 | Celi | |

* cited by examiner

WALL REPAIR PLUG SYSTEM

CROSS-REFERENCE TO RELATED APPLICATIONS

This application claims the benefit of U.S. Provisional Patent Application 62/482,542, filed on Apr. 6, 2017, and incorporated herein by reference.

STATEMENT REGARDING FEDERALLY SPONSORED RESEARCH AND DEVELOPMENT

Not Applicable.

FIELD OF THE INVENTION

This invention relates to a quick-installation anchoring device and system, and more particularly to a combination wall repair and anchoring device.

DISCUSSION OF RELATED ART

Typical wall anchors that hold items such as a towel bar to the wall have several drawbacks: 1) they often lack sufficient strength for the demands placed upon the item that's being secured to the wall; 2) they easily strip a hole in drywall if they are turned in to the hole too far; and 3) over time they become loose and unstable and thereafter provide limited holding strength. When such prior wall anchors need to be replaced, this typically requires a time-consuming trip to the hardware store to buy a drywall patch kit, as drywall patching supplies are not typically kept in most homes. Additional time is required to cut, patch, smooth, sand, texture, paint, and touch up the drywall before the job is completed. And because many items mounted to walls, such as toilet paper holders, bath towel bars and curtain rods, are elongated, they need to be mounted or attached with two brackets, one at either end. This often requires the repair of two to four holes, such repairs often not blending in or matching the original wall area perfectly. Moreover, often the repaired area, if not repaired correctly, is weaker than the original wall and subject to subsequent failure.

There are some costs involved in buying a drywall patch kit, but the main disadvantage is that this process takes a lot of time and can be very frustrating unless the user is practiced at drywall repair. Usually a towel bar is placed at a desired height and centered on a particular bathroom wall, for example, and thus after the drywall is repaired the user often desired to replace the towel bar at the original location. As previously mentioned, the repaired area is often weaker than the original drywall, and thus drilling new holes over the previously-repaired holes can cause failure of the repair, requiring the user to repeat this time-consuming process with a stronger repair.

Therefore, there is a need for a device that allows for quickly plugging a damaged drywall hole by forming a larger hole with a stronger plug. The desired plug would provide replacement anchors at a plurality of locations and would have a larger surface area of contact than the original anchors, thereby resulting in a repair having increased strength. Such a needed device would be relatively inexpensive to manufacture, and would require a minimal amount of time to install. The present invention accomplishes these objectives.

SUMMARY OF THE INVENTION

The present device is a plug system for repairing a hole in a wall with a rotary tool, such as a rotary drill or a screwdriver. Often the hole is caused by stripped screws or force applied to a screw and anchor, the hole being positioned where a bracket for a towel bar or some other object is required to be positioned.

A generally cylindrical and rigid plug body has a distal end and a proximal end. The distal end has a grooving implement that is adapted to cut or abrade the wall. The proximal end has at least one thread projecting outwardly from the plug body, a tool mount axially aligned with the plug body and within a rear cavity formed in the distal end of the plug body and adapted to engage the rotary tool. The plug body may further include a drill bit projecting away from the distal end thereof and aligned longitudinally therewith to keep the plug body properly positioned while cutting through the wall.

A plug is adapted for fitting within the rear cavity. The plug has a rear surface and includes at least a central screw aperture axially aligned with the plug body. Alternately, or additionally, the plug may include a plurality of the screw apertures aligned in pairs, each pair of screw apertures separated by a unique distance and centered about the longitudinal axis of the plug.

The plug may further include a central cylindrical conduit about which the pairs of screw apertures are positioned. The central cylindrical conduit is adapted for receiving a portion of the rotary tool therethrough, such as a socket driver, whereby the portion of the rotary tool engages the tool mount of the plug body while traversing the central cylindrical conduit.

In such an embodiment, the plug system may further include a central screw aperture insert selectively fixable within the central cylindrical conduit. Such a central screw aperture insert includes the central screw aperture axially aligned with the plug body when the central screw aperture insert is fixed with the central cylindrical conduit, so that a screw may be fastened into the central screw aperture to hold the object on the wall (if only one screw is required).

In use, with the plug body fixed with the rotary tool at the tool mount, the rotary tool is activated to rotate the plug body to cut or abrade the wall around the hole, cutting a generally circular plug hole in the wall that is larger than the hole to be repaired. The drill bit, if provided, guides the plug body into the wall at the desired location. The at least one thread of the plug body engage the wall until the proximal end of the plug body is substantially flush with the wall. The plug is thereafter fitted into the rear cavity of the plug body to repair the wall, and to provide screw apertures at the desired location on the wall to hold the object if needed.

The groove implement preferably includes at least one or two distally-projecting blades. In some embodiments the groove implement includes a detachable cutting ring selectively fixable to the distal end of the plug body. The cutting ring includes at least one distally-projecting blade, and preferably two blades.

Alternately, or additionally, the groove implement includes at least one abrading surface that may be included on an abrading attachment that is selectively fixable to the cutting ring at a proximal side of the abrading attachment. The abrading attachment includes a blade cover for each of the at least one blades on the proximal side thereof, and at least one of the abrading surfaces on a distal side. As such, the at least one abrading surface of the abrading attachment abrades the wall when rotating. Preferably the at least one abrading surface is an abrading ring projecting away from the distal side of the abrading attachment.

In some embodiments, the tool mount includes a keyed aperture through which a combination drill and keyed plug are inserted. The combination drill and keyed plug is aligned along the longitudinal axis of the plug body and projects distally away from the distal end thereof. The combination drill and keyed plug fits within the keyed aperture for rotationally fixing the plug body to the combination drill and keyed plug. The combination drill and keyed plug is then engaged with the rotary tool to rotate the combination drill and keyed plug, the plug body, the cutting ring, and the abrading attachment.

In some embodiments, the distal side of the abrading attachment includes a central recess. The plug system further includes a guide piece with a central aperture through which the combination drill and keyed plug projects. A thickness of the guide piece is less than the depth of the central recess of the abrading attachment, roughly corresponding to a paper front layer of some of the walls. As such, the at least one abrading surface of the abrading attachment abrades partially through the wall. The guide piece then contacts the abrading attachment to prevent the abrading attachment from abrading deeper into the wall, and the abrading attachment is thereafter removed to expose the at least one blade of the cutting ring for cutting through the remainder of the wall.

The present invention is a system that allows for quickly plugging/repairing a damaged drywall hole by forming a larger hole with a strongly-attached plug. The present invention provides replacement anchors at a plurality of locations/orientations and results in a larger surface area of contact with the wall than the original anchors, thereby resulting in a repair having increased strength. The present system is relatively inexpensive to manufacture, and requires a minimal amount of time to install. Other features and advantages of the present invention will become apparent from the following more detailed description, taken in conjunction with the accompanying drawings, which illustrate, by way of example, the principles of the invention.

DETAILED DESCRIPTION OF THE
PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
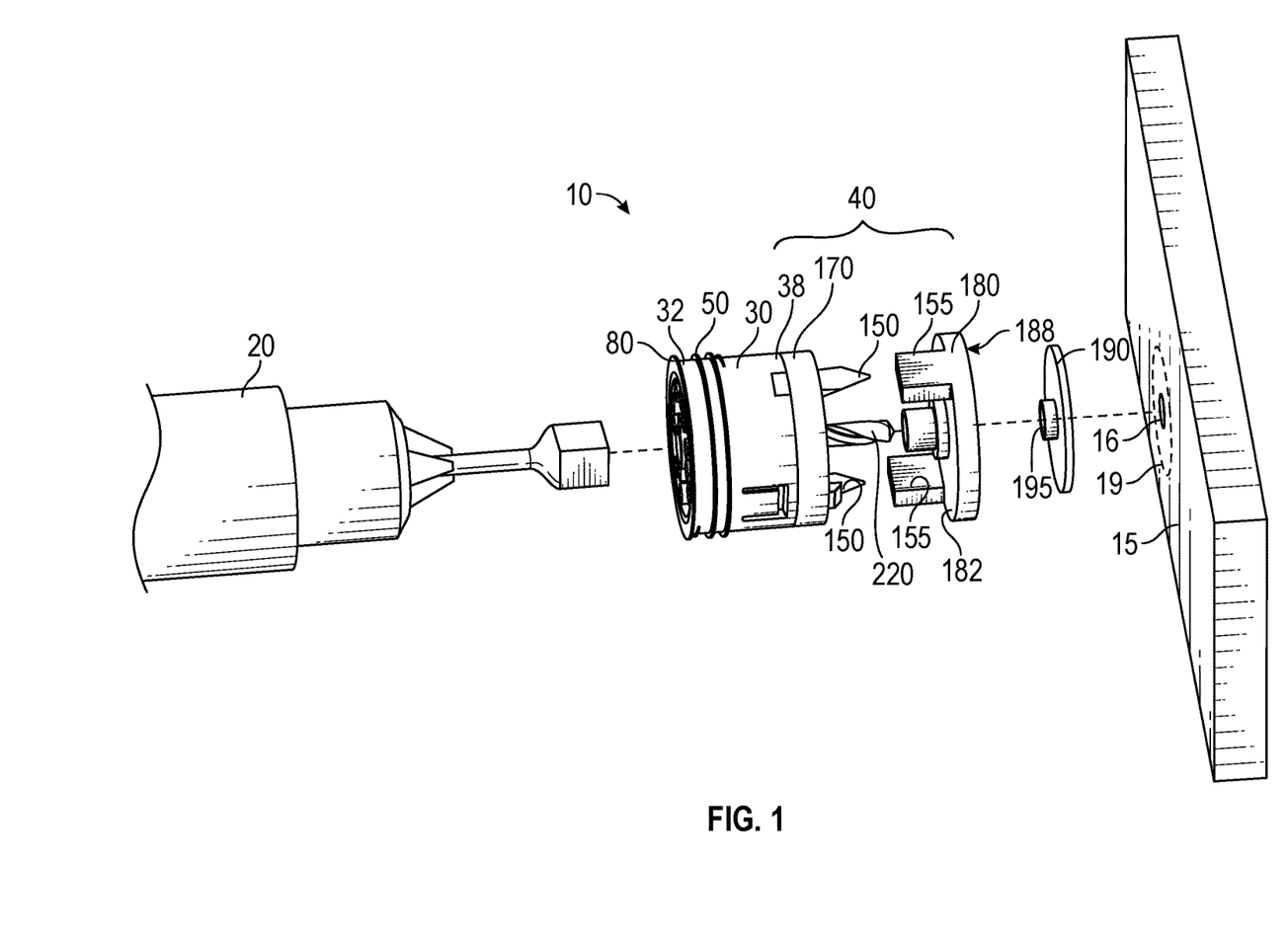
FIG. 1 is a partially-exploded side perspective view of the invention.
Figure 2:
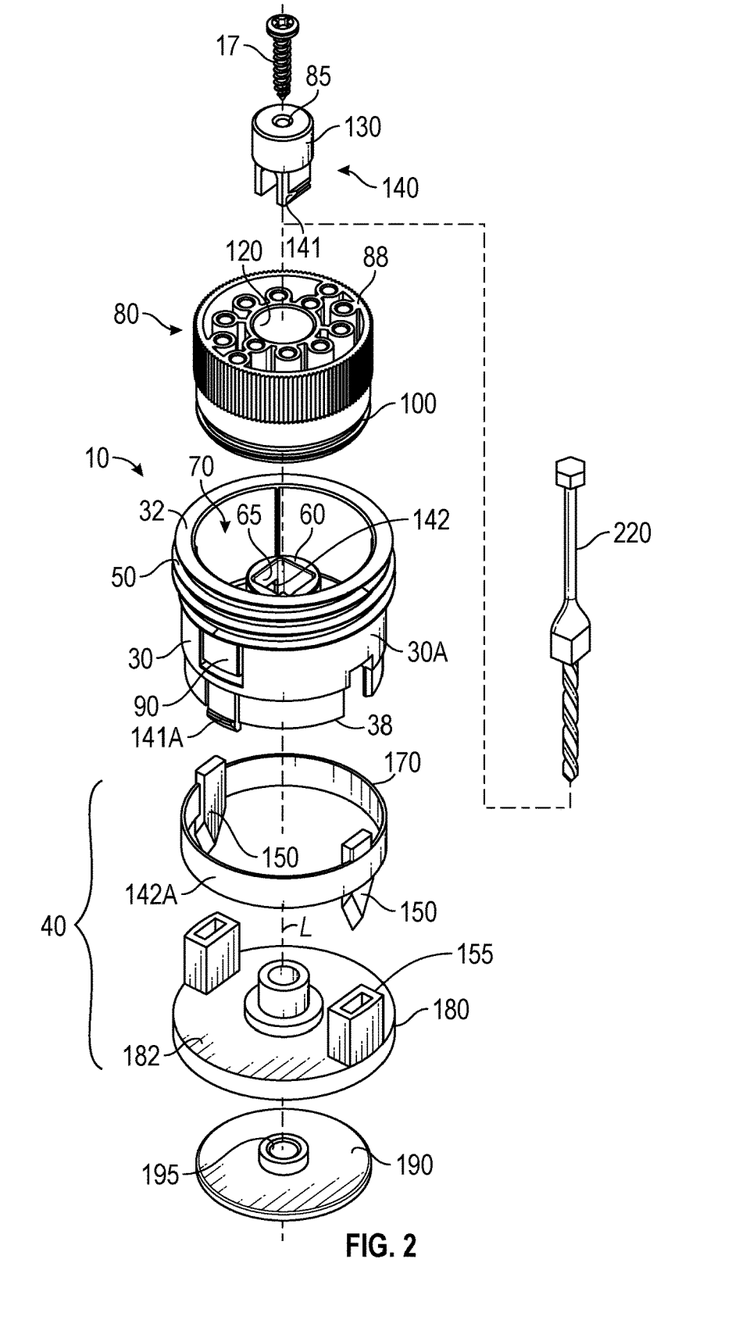
FIG. 2 is an exploded rear perspective view of the invention.
Figure 3:
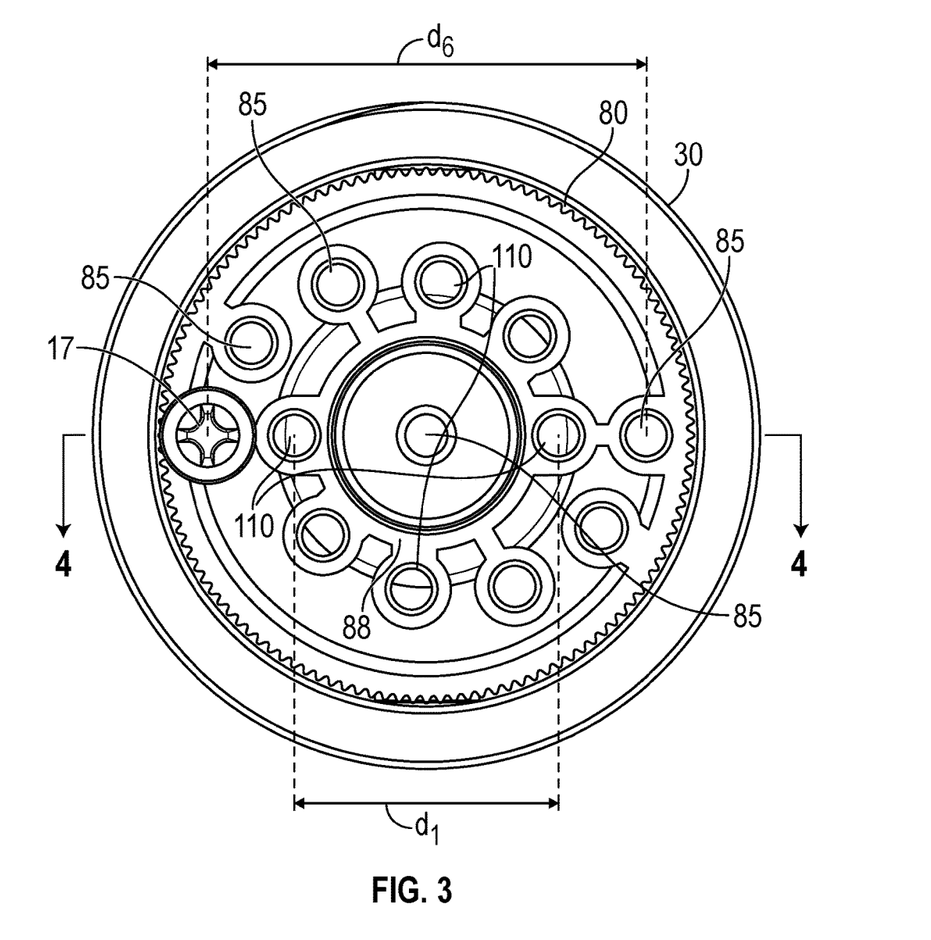
FIG. 3 is a front elevational view of the invention.

FIGS. 1 and 2 illustrate a plug system 10 for repairing a hole 16 in a wall 15 with a rotary tool 20, such as a rotary drill. Often the hole 16 is caused by stripped screws or force applied to a screw and anchor (not shown), the hole 16 being positioned where a bracket 18 for a towel bar or some other object 18 is required to be positioned. The wall 15 is typically drywall with a paper front portion (not shown).

A generally cylindrical and rigid plug body 30 has a distal end 38 and a proximal end 32. The distal end 38 has a grooving implement 40 that is adapted to cut or abrade the wall 15. The proximal end 32 has at least one thread 50 projecting outwardly from the plug body 30, a tool mount 60 axially aligned with the plug body 30 and within a rear cavity 70 formed in the distal end 38 of the plug body 30 and adapted to engage the rotary tool 20. The plug body 30 may further include a drill bit 21 projecting away from the distal end 38 thereof and aligned longitudinally therewith.

Figure 7:
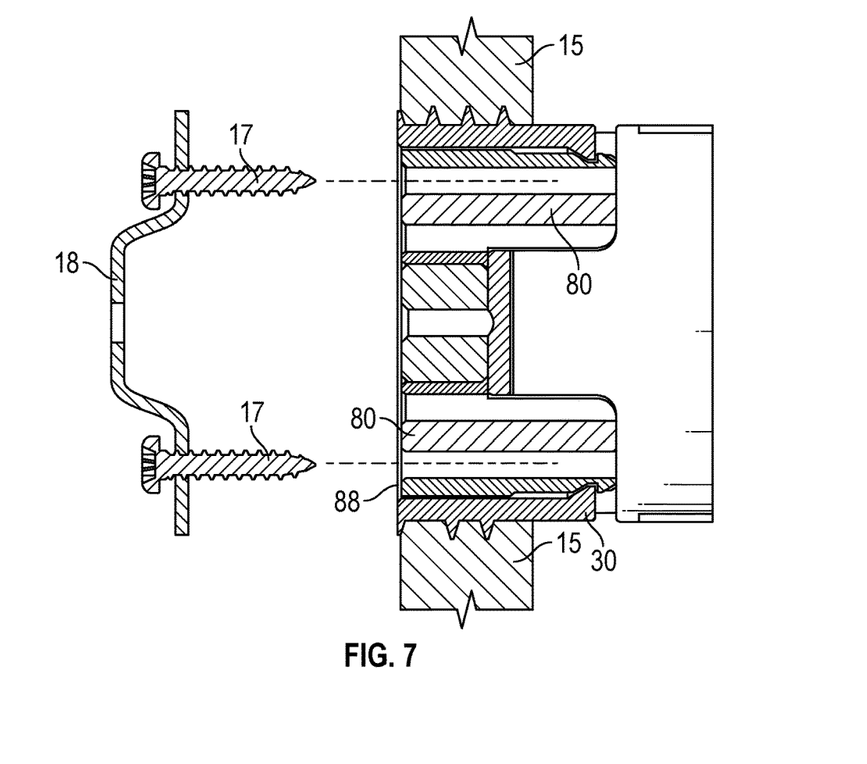
FIG. 7 is a cross-sectional view of the invention, take along lines 4-4 of FIG. 3, illustrating the plug body fixed through the wall until a rear surface of a plug is flush with the wall.

A plug 80 is adapted for fitting within the rear cavity 70. The plug 80 has a rear surface 88 and is typically made from a rigid plastic material, as is the plug body 30. The plug 80 may include at least a central screw aperture 85 axially aligned with the plug body 30, such that a screw 17 may be fastened into the central screw aperture 85 to hold an object 18 (FIG. 7) on the wall 15. Alternately, or additionally, the plug 80 may include a plurality of the screw apertures 85 aligned in pairs 110, each pair 110 of screw apertures 85 separated by a unique distance $D_x$ and centered about the longitudinal axis L of the plug 80. As such, if two screws are required to hold the object 18 to the wall 15, the appropriately-spaced pair 110 of the screw apertures 85 may be selected and aligned vertically so as to accommodate the fastening of the object 18 to the plug 80 and the plug body 30. The plug 80 is rotatable within the recess 70 of the plug body 30. As such, a selected pair of the plurality of pairs 110 of the screw apertures 85 can be rotated until vertically aligned.

The plug 80 may further include a central cylindrical conduit 120 about which the pairs 110 of screw apertures 85 are positioned. The central cylindrical conduit 120 is adapted for receiving a portion of the rotary tool 20 therethrough, such as a socket driver (not shown), whereby the portion of the rotary tool engages the tool mount of 60 of the plug body 30 while traversing the central cylindrical conduit 120.

In such an embodiment, the plug system 10 may further include a central screw aperture insert 130 selectively fixable within the central cylindrical conduit 120. Such a central screw aperture insert 130 includes the central screw aperture 85 axially aligned with the plug body 30 when the central screw aperture insert 130 is fixed with the central cylindrical conduit 120, so that a screw 17 may be fastened into the central screw aperture 85 to hold the object 18 on the wall 15 (if only one screw 17 is required). The central screw aperture insert 130 is preferably fixed with the tool mount 60 with a mechanical fastener 140, such as a two-part fastener having at least one resilient hook 141, preferably on the central screw aperture insert 130, that engages at least one ridge 142, preferably in the tool mount 60 (FIG. 2).

In use, with the plug body 30 fixed with the rotary tool 20 at the tool mount 60, the rotary tool 20 is activated to rotate the plug body 30 to cut or abrade the wall 15 around the hole 16, cutting a generally circular plug hole 19 in the wall that is larger than the hole 16 to be repaired. The drill bit 21, if provided, guides the plug body 30 into the wall 15 at the desired location. The at least one thread 50 of the plug body 30 engage the wall 15 until the proximal end 32 of the plug body 30 is substantially flush with the wall 15. The plug 80 is thereafter fitted into the rear cavity 70 of the plug body 30 to repair the wall 15, and to provide screw apertures 85 at the desired location on the wall 15 to hold the object 18. In some embodiments the rear surface 88 of the plug 80 is a continuous flat surface (not shown), or a textured flat surface, such that the hole 16 is fully repaired and can be painted thereafter. In such embodiments the plug body 30 may be rotationally driven into the wall 15 slightly past a front surface of the wall 15 so that the plug 80, when inserted into the recess 70 of the plug body 30, is flush with the wall 15 for a nearly seamless repair.

Preferably the plug body 30 includes at least one plug engaging resilient hook 90, and the plug 80 includes at least one plug body engaging cooperative ridge 100, such that the at least one plug engaging resilient hook 90 of the plug body 30 engages the at least one plug body engaging cooperative ridge 100 when the plug 80 is fully seated within the rear cavity 70 of the plug body 30, capturing the plug 80 within the plug body 30. The at least one plug engaging resilient hook 90 may be pried outward to release the plug 80 if needed. The rear cavity 70 may be defined by sides 30A of the plug body 30.

The groove implement 40 preferably includes at least one or two distally-projecting blades 150, preferably made of metal, strong and rigid plastic, or the like. In some embodiments the groove implement 40 includes a detachable cutting ring 170 selectively fixable to the distal end 38 of the plug body 30, such as with the at least one resilient hook 141A (FIG. 2) that engages at least one ridge or rim 142A. The cutting ring 170 includes at least one distally-projecting blade 150, and preferably two blades 150. The at least one blade 150 is either integrally formed with the cutting ring or attached thereto.

Figure 4:
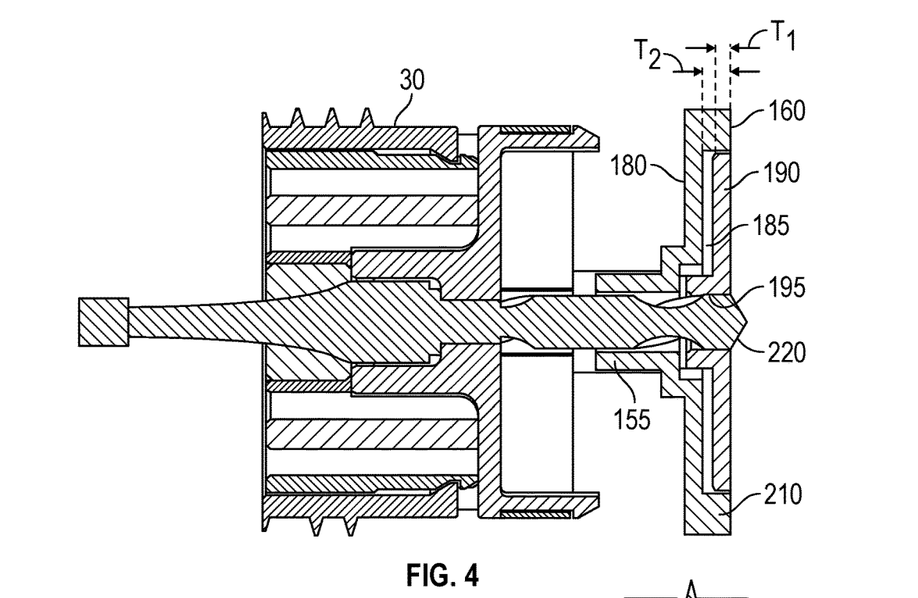
FIG. 4 is a cross-sectional view of the invention, taken along lines 4-4 of FIG. 3.
Figure 5:
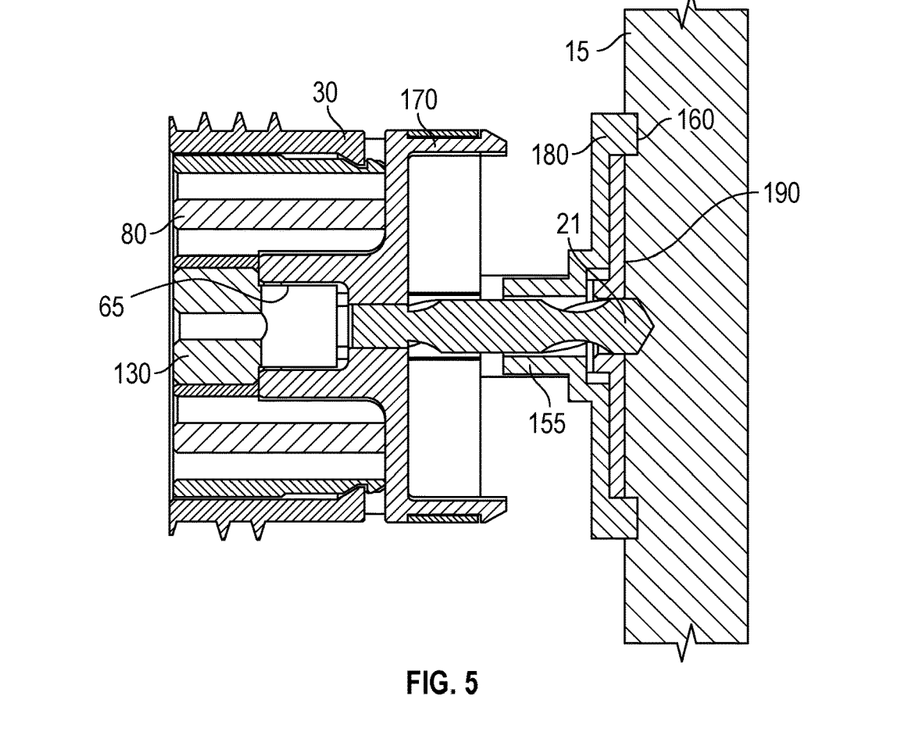
FIG. 5 is a cross-sectional view of the invention, taken along lines 4-4 of FIG. 3, illustrating a guide-piece of the invention contacting a wall when an abrading ring has abraded through a first portion of the wall.
Figure 8:
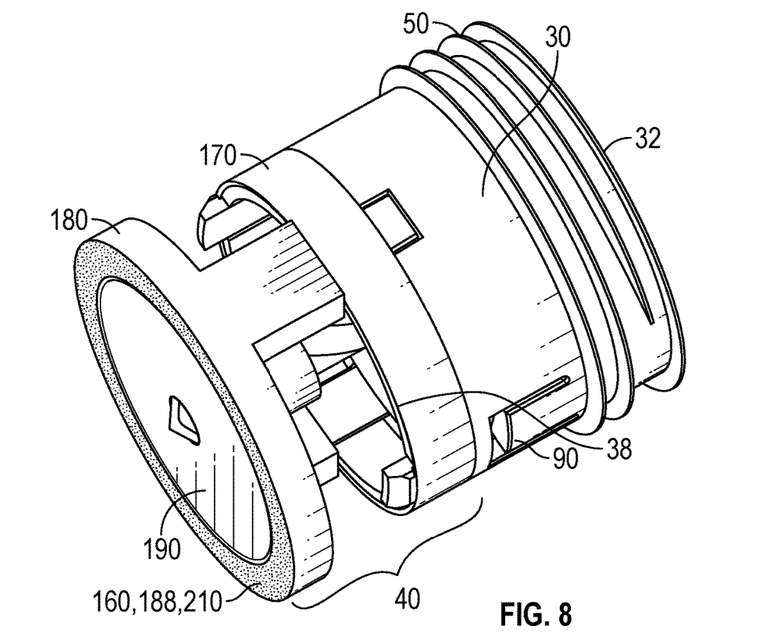
FIG. 8 is a front perspective view of the invention.

Alternately, or additionally, the groove implement 40 includes at least one abrading surface 160 (FIGS. 4 and 8). Such an abrading surface 160 may be included on an abrading attachment 180 that is selectively fixable to the cutting ring 170 at a proximal side 182 of the abrading attachment 180. The abrading attachment 180 includes a blade cover 155 for each of the at least one blades 150 on the proximal side 182 thereof, and at least one of the abrading surfaces 160 on a distal side 188. As such, the at least one abrading surface 160 of the abrading attachment 180 abrades the wall 15 (FIG. 5) when the abrading attachment 180 is fixed with the at least one blade 150 and the cutting ring 170, and when the cutting ring 170 is fixed with the plug body 30, the plug body 30 being circularly-driven by the rotary tool 15. Preferably the at least one abrading surface 160 is an abrading ring 210 projecting away from the distal side 188 of the abrading attachment 180 (FIG. 5). In some embodiments, the cutting ring is chamfered (not shown) at the outer perimeter thereof to help effect a smooth circular plug hole 19.

In embodiments with the detachable abrading attachment 180 and the detachable cutting ring 170, once the abrading attachment 180 abrades partially through the wall 15 and then is detached from the cutting ring 170, and once the cutting ring 170 completely cuts through the wall 15 to form the circular plug hole 19 and detached from the plug body 30, the abrading attachment 180 and cutting ring 170 may be stored for future use with another plug body 30. The combination drill and keyed plug 220 is also subsequently removed from the plug body 30 and stored for future use. The plug body 30 thereafter is screwed into the circular plug hole 19 to repair the wall 15, the plug body 30 and plug 80 being made of rigid plastic to minimize expense. Accordingly, the abrading attachment 180 and the cutting ring 170 may be made from more expensive metallic materials, if desired, for durability.

Figure 9:
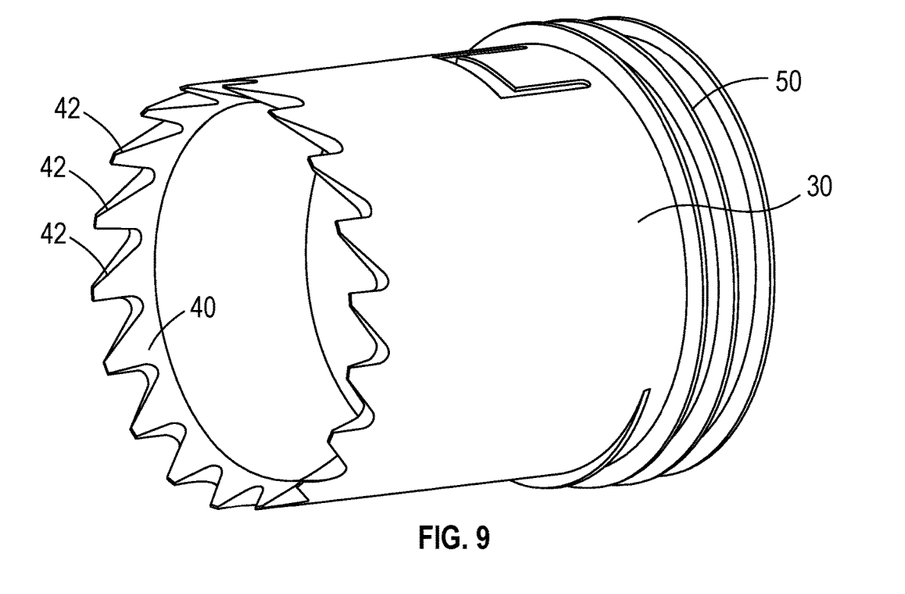
FIG. 9 is a front perspective view of an alternate embodiment of the plug body.

In some embodiments the grooving implement 40 includes a plurality of plastic teeth 42 (FIG. 9) that are either integrally formed with the plug body 30 or are separately attachable, such as through a threaded screw arrangement (not shown) to the plug body 30. In such an embodiment the abrading attachment 180 is selectively attachable with the plug body 30 directly.

Figure 6:
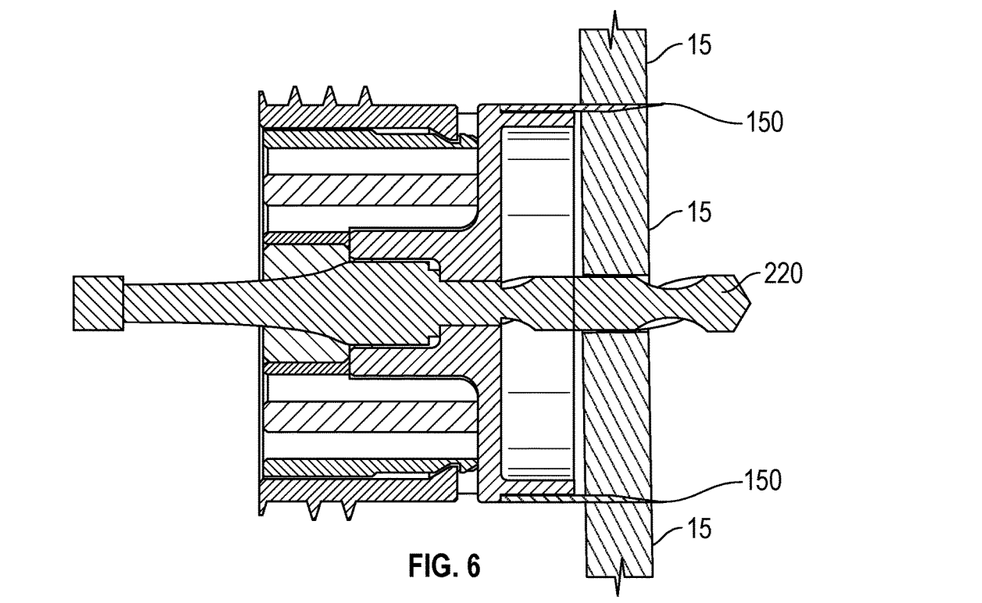
FIG. 6 is a cross-sectional view of the invention, taken along a line perpendicular to lines 4-4 of FIG. 3 intersecting at the longitudinal axis of a plug of the invention, illustrating an abrading attachment removed and blades of a grooving implement cutting completely through the wall to form a plug hole in the wall.

In some embodiments, the tool mount 60 includes a keyed aperture 65 through which a combination drill and keyed plug 220 are inserted (FIGS. 2 and 6). The combination drill and keyed plug 220 is aligned along the longitudinal axis of the plug body 30 and projects distally away from the distal end 38 thereof. The combination drill and keyed plug 220 fits within the keyed aperture 65 for rotationally fixing the plug body 30 to the combination drill and keyed plug 220. The combination drill and keyed plug 220 is then engaged with the rotary tool 20 to rotate the combination drill and keyed plug 220, the plug body 30, the cutting ring 170, and the abrading attachment 180.

In some embodiments, the distal side 188 of the abrading attachment 180 includes a central recess 185 (FIGS. 4 and 5). The plug system 10 further includes a guide piece 190 with a central aperture 195 through which the combination drill and keyed plug 220 projects. A thickness $T_1$ of the guide piece 190 is less than the depth $T_2$ of the central recess 185 of the abrading attachment 180, roughly corresponding to a paper front layer (not shown) of some of the walls 15. As such, the at least one abrading surface 160 of the abrading attachment 180 abrades partially through the wall 15. The guide piece 190 then contacts the abrading attachment 180 to prevent the abrading attachment 180 from abrading deeper into the wall 15, and the abrading attachment 180 is thereafter removed to expose the at least one blade 150 of the cutting ring 170 for cutting through the remainder of the wall 15.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A plug system for repairing a hole in a wall with a rotary tool, comprising:
   a generally cylindrical plug body having a distal end and a proximal end, the distal end having a projecting blade adapted to cut the wall;
   an abrading attachment removably attachable to the distal end of the plug body, the abrading attachment adapted to abrade the wall while preventing the projecting blade from cutting the wall;
   at least one thread extending outwardly from sides of the plug body at the proximal end thereof;
   a rear cavity formed in and accessible from the proximal end of the plug body, the rear cavity defined by the sides of the plug body;
   a plug adapted for fitting within the rear cavity and having a rear surface;
   whereby the projecting blade cuts a plug hole in the wall such that the threads of the plug body engage the wall until the plug body is substantially flush with the wall, the plug fitted into the rear cavity of the plug body to repair the wall.

2. The plug system of claim 1 wherein the plug body includes at least one plug engaging resilient hook and wherein the plug includes at least one plug body engaging cooperative ridge, such that the at least one plug engaging resilient hook of the plug body engages the at least one plug body engaging cooperative ridge when the plug is fully seated within the rear cavity of the plug body, capturing the plug within the plug body.

3. The plug system of claim 2 wherein the plug includes at least a central screw aperture axially aligned with the plug body, whereby a screw fastened into the central screw aperture is configured to hold an object on the wall.

4. The plug system of claim 2 wherein the plug includes a plurality of screw apertures aligned in pairs, each pair of screw apertures separated by a unique distance and centered about the longitudinal axis of the plug, the plug rotatable within the rear recess of the plug body.

5. The plug system of claim 4 wherein the plug includes a central cylindrical conduit about which the pairs of screw apertures are positioned, the central cylindrical conduit adapted for receiving a portion of the rotary tool therethrough.

6. The plug system of claim 5 further including a central screw aperture insert selectively fixable within the central cylindrical conduit and including the central screw aperture axially aligned with the plug body, whereby the central screw aperture insert is fixed with the central cylindrical conduit so that a screw fastened into the central screw aperture is configured to hold an object on the wall.

7. The plug system of claim 1 wherein the projecting blade includes at least one distally-projecting blade.

8. The plug system of claim 1 wherein the projecting blade includes at least two distally-projecting blades.

9. The plug system of claim 1 wherein the abrading attachment includes at least one abrading surface.

10. The plug system of claim 9 wherein the at least one abrading surface is an abrading ring projecting away from the distal side of the abrading attachment.

11. The plug system of claim 10 wherein the tool mount includes a keyed aperture through which a combination drill and keyed plug are inserted, the drill aligned along the longitudinal axis of the plug body and projecting distally away from the distal end thereof and through the cutting ring and abrading attachment, the keyed plug fitting within the keyed aperture for rotationally fixing the plug body to the combination drill and keyed plug, the keyed plug engaged with the rotary tool to rotate the drill, the plug body, the cutting ring and the abrading attachment.

12. The plug system of claim 1 wherein the projecting blade is a detachable cutting ring selectively fixable to the distal end of the plug body, the cutting ring including at least one distally-projecting blade.

13. The plug system of claim 1 wherein the tool mount includes a keyed aperture through which a combination drill and keyed plug are inserted, the drill aligned along the longitudinal axis of the plug body and projecting distally away from the distal end thereof, the keyed plug fitting within the keyed aperture for rotationally fixing the plug body to the combination drill and keyed plug, the keyed plug engaged with the rotary tool to rotate the drill and the plug body.

14. The plug system of claim 13 wherein the distal side of the abrading attachment includes a central recess, the plug system further including a guide piece with a central aperture through which the combination drill and keyed plug projects, the thickness of the guide piece less than the depth of the central recess of the abrading attachment, whereby the at least one abrading surface of the abrading attachment abrades partially through the wall, the guide piece contacts the abrading attachment to prevent the abrading attachment from abrading deeper into the wall, the abrading attachment thereafter removed to expose the at least one projecting blade for cutting through the wall.

15. A plug system for repairing a hole in a wall, comprising:
   a generally cylindrical plug body;
   at least one projecting blade extending from a first end of the plug body;
   a recess formed within a second end of the plug body, the recess defined by a side wall of the plug body, wherein the second end of the plug body is open to provide access to the recess;
   a plug removably attachable into the recess; and
   threads formed about an exterior of the side wall of the plug body at the second end thereof, wherein the at least one projecting blade is configured to cut a repair hole in the wall having a diameter such that the threads engage an interior surface of the repair hole to support the plug body in the wall.

16. The plug system of claim 15, further comprising an abrading attachment removably fitting on the first end of the plug body, the abrading attachment preventing contact of the at least one projecting blade with the wall while allowing an abrading surface of the abrading attachment to cut away at least a first portion of the wall.

17. The plug system of claim 16, further comprising a guide piece attachable to the wall, the guide piece having a central aperture configured to guide a drill therethrough, wherein the drill extends centrally through the plug body and extends beyond the first end thereof, the guide piece having a diameter smaller than a diameter of the plug body.

18. The plug system of claim 17, wherein a distal side of the abrading attachment includes a central recess and the guide piece has a thickness less than a depth of the central recess of the abrading attachment, whereby the abrading surface of the abrading attachment abrades partially through the wall, the guide piece contacts the abrading attachment to prevent the abrading attachment from abrading deeper into the wall.

* * * * *